United States Patent [19]

Ishii

[11] Patent Number: 4,989,147

[45] Date of Patent: Jan. 29, 1991

[54] LINE PRESSURE CONTROL DEVICE FOR AUTOMATIC TRANSMISSION

[75] Inventor: Shigeru Ishii, Atsugi, Japan

[73] Assignee: Nissan Motor Co., Ltd., Yokohama, Japan

[21] Appl. No.: 314,340

[22] Filed: Feb. 22, 1989

[30] Foreign Application Priority Data

Mar. 1, 1988 [JP] Japan .................................. 63-45736

[51] Int. Cl.$^5$ ...................... G06F 15/20; G60K 41/18
[52] U.S. Cl. .............................. 364/424.1; 364/571.04; 364/571.05; 74/867
[58] Field of Search ........... 364/424.1, 571.01, 571.04, 364/571.05; 74/856, 865, 866, 867, 870

[56] References Cited

U.S. PATENT DOCUMENTS

| | | | |
|---|---|---|---|
| 4,490,804 | 12/1984 | Martinsons | 364/571.05 |
| 4,730,521 | 3/1988 | Hayasaki et al. | 74/867 |
| 4,730,522 | 3/1988 | Morimoto | 74/868 |
| 4,791,568 | 12/1988 | Hiramatsu et al. | 364/424.1 |
| 4,833,613 | 5/1989 | Mack et al. | 364/424.1 |
| 4,930,079 | 5/1990 | Kondo | 364/571.05 |

Primary Examiner—Felix D. Gruber
Attorney, Agent, or Firm—Foley & Lardner, Schwartz, Jeffery, Schwaab, Mack, Blumenthal & Evans

[57] ABSTRACT

In order to prevent abnormally high or low line pressures during low throttle operation of the engine, a line pressure control schedule is revised when an idle switch indicates that the throttle valve has in fact assumed a fully closed position, in a manner wherein the fully closed value in the schedule is compared with that produced by throttle position sensor, and is changed incrementally at predetermined time intervals in the event that a difference exits.

6 Claims, 3 Drawing Sheets

LINE PRESSURE CONTROL DEVICE FOR AUTOMATIC TRANSMISSION

BACKGROUND OF THE INVENTION

1. Field of the Invention

The present invention relates to line pressure control for an automatic transmission and more specifically to a line pressure arrangement which includes a memory the values of which can be updated in order to compensate for unit to unit variation between sensors used in the system.

2. Description of the Prior Art

U.S. Pat. No. 4,730,521 discloses a line pressure control arrangement which is equipped with a memory in which the appropriate line pressure level is recorded in terms of throttle valve opening angle.

However, this arrangement has suffered from the drawback that the line pressure/throttle opening data is fixed and cannot be adjusted to take into account the inevitable unit to unit variation in output in the various sensors used in the system, particularly the throttle valve position sensing devices. Accordingly, at low throttle openings, as the throttle pressure gain is high, the deviations between throttle position sensors is apt to induce the situation wherein the level of the line pressure is excessively increased.

This sudden increase in line pressure level under low load operation causes overly powerful engagement of the friction elements of the transmission for the amount of torque which needs to be transmitted under the circumstances and renders the suppression of shift and selection shock.

SUMMARY OF THE INVENTION

It is an object of the invention to provide a line pressure control arrangement which includes a memory storing data which can be revised in accordance with the output of a sensor or sensors and thus obviate erroneous control characteristics which occur due to the difference in output which tend to occur because of unit to unit deviations in sensor construction.

In brief, the present invention is deemed to achieve the above mentioned object by providing an arrangement wherein a line pressure control schedule is revised when an idle switch indicates that the throttle valve has in fact assumed a fully closed position, in a manner wherein the value in the schedule which indicates a fully closed status, is compared with that produced by the throttle position sensor, and the schedule is changed incrementally at predetermined time intervals in the event that a difference exist until agreement is achieved. This readjusts the schedule in accordance with the output characteristics of the throttle valve sensor and ensures the intended line pressure-throttle position control is achieved.

A first aspect of the present invention is deemed to comprise a transmission associated with an engine having a throttle valve, the transmission featuring: a memory in which transmission line pressure control schedule is recorded in terms of an engine throttle valve opening degree and line pressure level; a first sensor arrangement for sensing the engine throttle valve assuming a fully closed position; a second sensor arrangement for sensing the opening degree of the engine throttle valve and producing a signal the level of which indicates the throttle position; and a control circuit, the control circuit including means responsive to the output of the first sensor arrangement indicating that the throttle valve is fully closed for revising the control schedule in a manner which brings the memorized signal level indicative of the throttle valve being fully closed, into agreement with the value of the signal indicated by the second sensor.

A second aspect of the present invention is deemed to comprise a vehicle which features: an engine; a throttle valve, the throttle valve being operatively disposed in an induction system ofthe engine; an idling switch, the idling switch being arranged to be closed and produce a signal when the throttle valve assumes a fully closed position; a throttle valve position sensor, the throttle valve position sensor being operatively connected with the throttle valve and arranged to produce a voltage signal which varies with the position of the throttle valve; and A/D converter, the A/D converter being operatively connected with the throttle valve position sensor for converting the analog type voltage signal produced thereby into a digital signal; a transmission operatively connected with the engine, the transmission including hydraulically operated friction elements; line pressure control means, the line pressure control means being arranged to control the hydraulic line pressure with which the hydraulically operated friction elements are operated; a control circuit; memory means, the memory means being included in the control circuit; a line pressure control schedule, the control schedule being stored in the memory means, the line pressure control schedule being recorded in terms of line pressure and throttle position; a processing unit, the processing unit being included in the control circuit and arranged to receive input data from the idle switch and the A/D converter, the processing unit comprising: means for correcting the control schedule in accordance with the input data in a manner wherein when the idle switch is on indicating the throttle valve is fully closed, the memorized voltage value which corresponds to a fully closed position in the control schedule is compared with that indicated by the throttle position sensor and in the event that a difference exists, the memorized value is incrementally changed by predetermined incremental values at a predetermined rate until the memorized value corresponds to the output by the throttle valve sensor.

DETAILED DESCRIPTION OF THE PREFERRED EMBODIMENT

Figure 1:
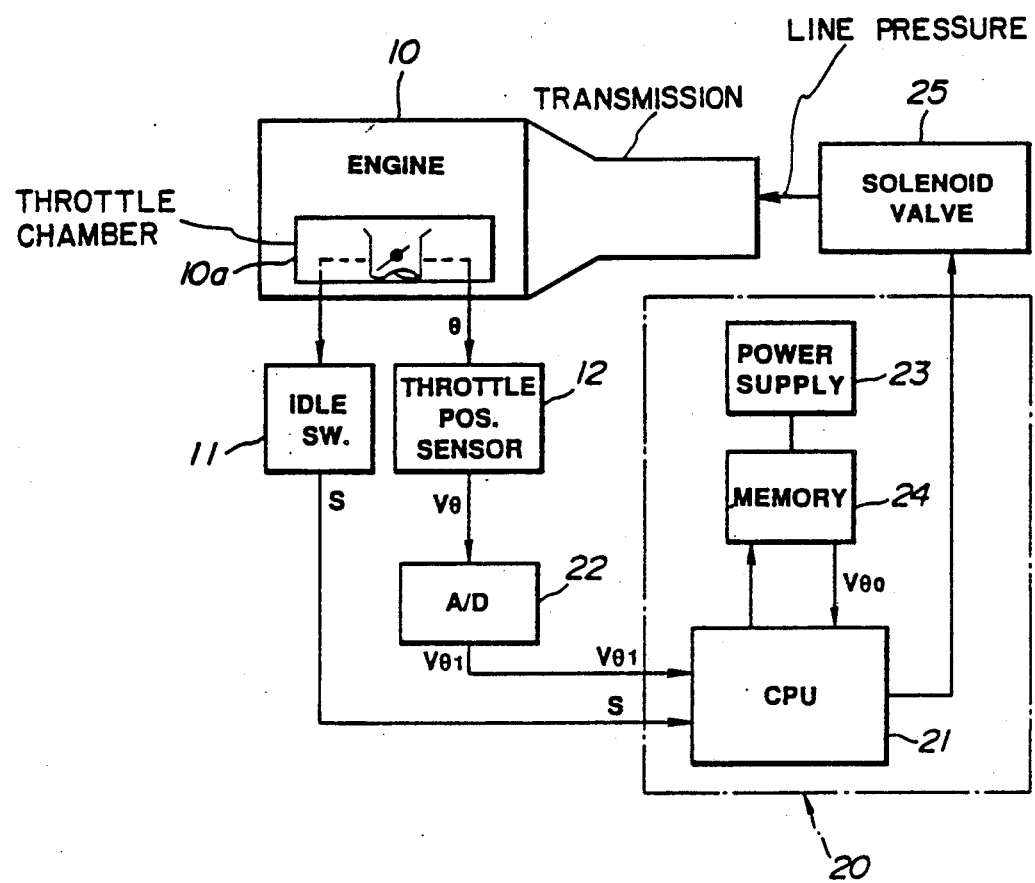
FIG. 1 shows in block diagram form a system which embodies the correction system according to the present invention.

In FIG. 1 an internal combustion engine 10 includes a throttle chamber 10a in which a idle switch 11 and a throttle opening sensor 12 are disposed. The output of the idle switch is supplied to a control circuit generally denoted by the numeral 20. This control circuit in this case includes a central processing unit (CPU) 21. This control unit 20 further receives an input from the throttle position sensor 12 via an A/D converter circuit 22. The control circuit further includes a back-up battery 23 which is operatively conected to memory circuit 24. The battery 23 and the memory circuit 24 are arranged to define a non-volatile memory arrangement which can retain the most recently updated values during periods when the vehicle (in which the system is disposed) is not in use.

When the idle switch is closed a high level signal S is supplied to the CPU 21 via a non-illustrated I/O interface. The throttle sensor 12 is arranged to produce an analog voltage signal V theta which varies with the opening degree of the throttle valve. The A/D converter circuit 22 converts the analog signal into a digital signal V theta 1.

Depending of the content of the signal V theta 1, the appropriate line pressure value is read out of memory and converted to into a suitable line pressure control signal which is suitably amplified and supplied to the solenoid ocntrolled line pressure control arrangement 25.

An example of a line pressure arrangement which can be controlled with the control signal produced by the CPU 21 can be found in U.S. Pat. No. 4,730,521 issued on Mar. 15, 1988 in the name of Hayasaki et al. The content of this document is hereby incorporated by reference thereto.

Figure 2:
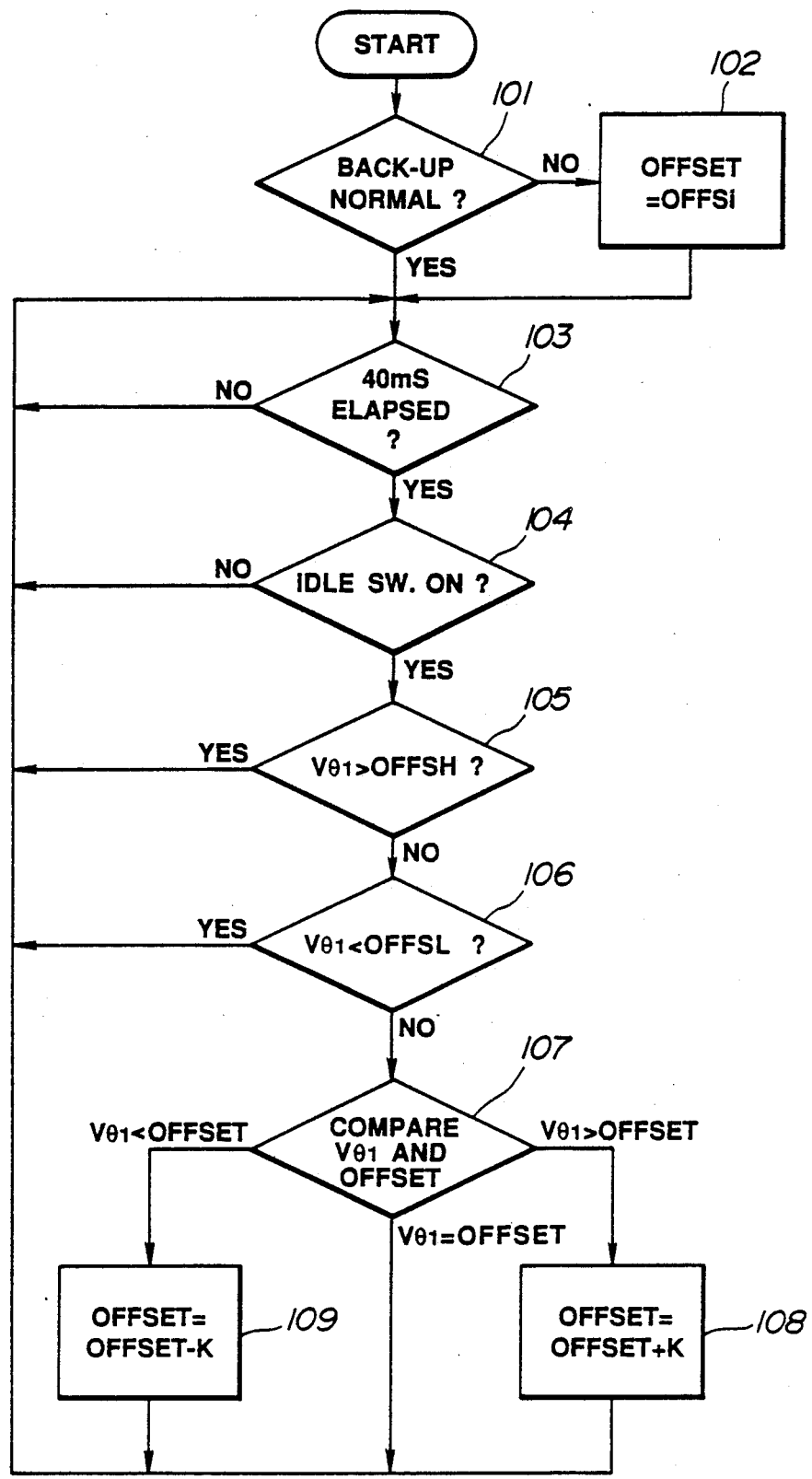
FIG. 2 is a flow chart showing the basic steps which are conducted in accordance with an embodiment of the present invention.
Figure 3:
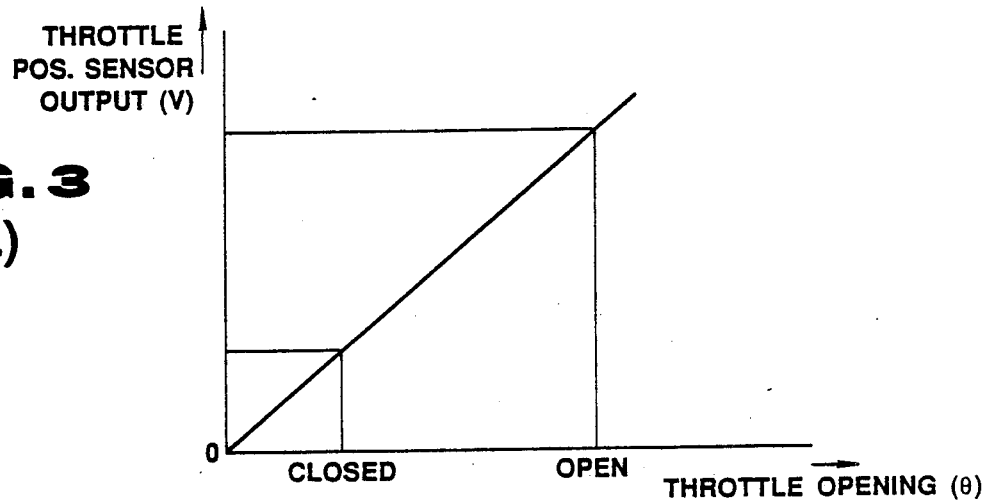
FIGS. 3a, 3b and 3c are timing charts which show the relationships which develop between the output of the throttle position sensor, the idle switch and the level of the resulting line pressure, as the opening degree of the throttle valve increases.
Figure 3:
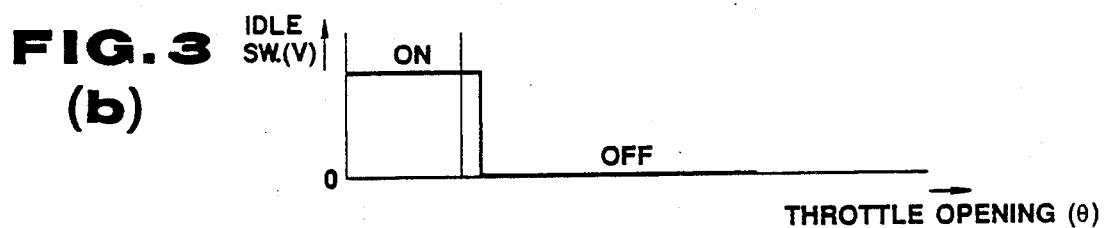
Figure 3:
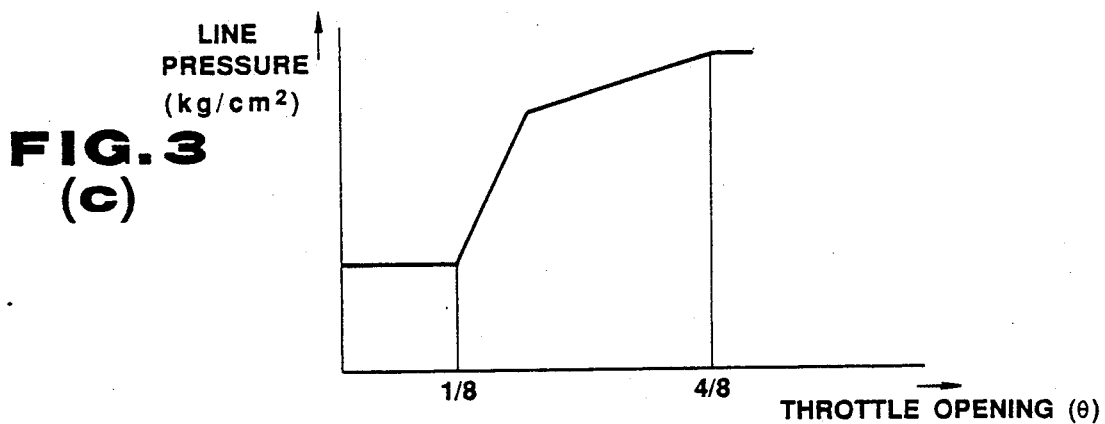

The control which characterizes the operation of the instant invention is shown in flow chart form in FIG. 2. As shown, the first step of this routine (101) is such as to determine if the battery backup of the memory is normal or not. In the event that an abnormality is detected then the program flows to step 102 wherein the value of the value OFFSET (a correction value which is used to adjust or correct the voltage value V theta 0 which denotes the fully closed throttle position) is arbitrarily set to a predetermined initial value OFFSi.

On the other hand, if the battery back-up of the memory is found to be be normal then the program goes to step 102 wherein a timer is checked to determine if a predetermined period of 40 ms has elapsed or not. As will become more clearly appreciated hereinlater, this timer functions to determine the pace with which the memory is incrementally updated.

Upon a predermined count indicative of 40 ms being reached the program ceases to cycle about step 103 flows to step 104 wherein the instant output of the idle switch 11 is checked. In the event that the idle switch 11 is ON and a high level signal is being generated, the program flows to step 105 wherein the digitized output (V theta 1) of the throttle position sensor 12 is sampled and compared with a predetermined upper limit OFFSH. If the instant position signal is found to be lower than the upper limit the program flows to step 106 wherein the instant throttle opening degree is then compared with a lower limit OFFSL. As will be appreciated, the above mentioned two steps 105 and 106 are such as to range the instant opening degree to determine if it is in fact within a suitable range and is fit to accept as new data.

Given that the instant throttle opening value is indicated as being suitable for data update, then at step 107 the instant opening value is compared with a value OFFSET which represents the current correction factor used to modify the line pressure control schedule. If the OFFSET value is greater than the instant throttle value opening, then the program goes to step 109 wherein the value of OFFSET is incrementally decreased. In this instance the increment K is selected to be 5/65536 volt. In other words, if the OFFSET value is found to be on the high side then each 40 ms the value thereof is decreased by the above mentioned amount. On the other hand, if the value of OFFSET is found to be on the low side, then the program flows to step 108 wherein the value thereof is incrementally increased.

Following steps 108 and 109 the program recycles to step 103 wherein the 40 ms count up is re-initiated.

Thus, with the present invention, by resetting the voltage value which denotes the fully closed throttle valve position, it is possible to revise the memorized data in a manner wherein the memorized voltages which denote the various throttle valve positions are shifted and brought into agreement with the actual voltage produced by the throttle valve sensor. This of course increases the accuracy of the line pressure control to that which was originally intended and thus assures that abnormally high or low pressures will not accidentally be produced due to the unit to unit deviations which tend to occur between the various sensors (particularly the throttle valve position sensor) and induce improper shock inducing shift characteristics.

What is claimed is:

1. In a transmission associated with an engine having a throttle valve:
   a memory in which transmission line pressure control schedule is recorded in terms of an engine throttle valve opening degree and line pressure level;
   a first sensor arrangement for sensing the engine throttle valve assuming a fully closed position;
   a second sensor arrangement for sensing the opening degree of said engine throttle valve and producing a signal the level of which indicates the throttle position; and
   a control circuit, said control circuit including means responsive to the output of said first sensor arrangement indicating that the throttle valve is fully closed for revising said control schedule in a manner which brings the memorized signal level indicative of the throttle valve being fully closed, into agreement with the value of the signal indicated by said second sensor.

2. A transmission as claimed in claim 1 wherein said revising means is arranged to incrementally change the memorized value by predetermined increments at predetermined time intervals.

3. A transmission as claimed in claim 1 further comprising:
   line pressure control means, said line pressure control means being operatively connected with said control circuit in a manner wherein the level of line presure produced by said line pressure control means is regulated in accordance with said control schedule.

4. A transmission as claimed in claim 1 wherein:
   said first sensor comprises an idle switch, said idle switch being arranged to normally produce a first signal and to output a second signal upon said throttle valve assuming a fully closed position; and
   said throttle valve position sensor comprises a variable resistor which is arranged in a manner wherein the voltage of the output changes with the position of the throttle valve.

5. A transmission as claimed in claim 4 further comprising an A/D converter, said A/D converter being operative connected between said second sensor and said control circuit in a manner to convert the analog signal produced by said second sensor into a digital signal suited for application to said control circuit, said control circuit including a microprocessor.

6. In a vehicle
an engine;
a throttle valve, said throttle valve being operatively diposed in an induction system of said engine;
an idling switch, said idling switch being arranged to the be closed and produce a signal when said throttle valve assumes a fully closed position;
a throttle valve position sensor, said throttle valve position sensor being operatively connected with said throttle valve and arranged to produce a voltage signal which varies with the position of the throttle valve;
an A/D converter, said A/D converter being operatively connected with said throttle valve position sensor for converting the analog type voltage signal produced thereby into a digital signal;
a transmission operatively connected with said engine, said transmission including hydraulically operated friction elements;
line pressure control means, said line pressure control means being arranged to control the hydraulic line pressure with which the hydraulically operated friction elements are operated;
a control circuit;
memory means, said memory means being included in said control circuit;
a line pressure control schedule, said control schedule being stored in said memory means, said line pressure control schedule being recorded in terms of line pressure and throttle position;
a processing unit, said processing unit being included in said control circuit and arranged to receive input date from said idle switch and said A/D converter, said processing unit comprising:
means for correcting the control schedule in accordance with said input data in a manner wherein when the idle switch is on indicating the throttle valve is fully closed, the memorized voltage value which corresponds to a fully closed position in the control schedule is compared with that indicated by said throttle position sensor and in the event that a difference exists, the memorized value is incrementally changed by predetemined incremental values at a predetermined rate until the memorized value corresponds to the output of the throttle valve sensor.

* * * * *